United States Patent [19]

Speranza et al.

[11] Patent Number: 5,140,097

[45] Date of Patent: Aug. 18, 1992

[54] THERMOPLASTIC THERMOSETTABLE POLYAMIDE FROM POLY(OXYTETRAMETHYLENE) DIAMINE AND POLY(OXYTETRAMETHYLENE) OLIGOMER POLYAMINE

[75] Inventors: George P. Speranza; Wei-Yang Su; Robert L. Zimmerman, all of Austin; Donald H. Champion, Pflugerville, all of Tex.

[73] Assignee: Texaco Chemical Company, White Plains, N.Y.

[21] Appl. No.: 608,128

[22] Filed: Nov. 1, 1990

[51] Int. Cl.$^5$ .............................................. C08G 69/26
[52] U.S. Cl. .................................. 528/342; 528/329.1; 528/338; 528/339; 528/340; 528/349
[58] Field of Search ..................... 528/342, 329.1, 338, 528/339, 340, 349

[56] References Cited

U.S. PATENT DOCUMENTS

| | | | |
|---|---|---|---|
| 3,558,419 | 1/1971 | Okazaki et al. | 161/173 |
| 4,062,820 | 12/1977 | Mitchell et al. | 260/18 |
| 4,119,615 | 10/1978 | Schulze | 528/343 |
| 4,128,525 | 12/1978 | Yeakey et al. | 260/29.1 |
| 4,133,803 | 1/1979 | Klein | 528/340 |
| 4,151,173 | 4/1979 | Vogel | 260/326.5 |
| 4,162,931 | 7/1979 | Yeakey et al. | 156/331 |
| 4,181,682 | 1/1980 | Watts, Jr. et al. | 260/584 |
| 4,182,845 | 1/1980 | Yeakey et al. | 528/340 |
| 4,218,351 | 8/1980 | Rasmussen | 260/18 |
| 4,239,635 | 12/1980 | Rieder | 252/34 |
| 4,282,346 | 8/1981 | Sharkey | 528/338 |
| 4,341,670 | 7/1982 | Hinze et al. | 528/342 |
| 4,684,439 | 8/1987 | Soerens | 162/111 |
| 4,743,387 | 5/1988 | Frangatos et al. | 252/51.5 |

OTHER PUBLICATIONS

Iwabuchi et al., "Preparation of Regularly Sequenced Polyamides with Definite Numbers of Oxyethylene Units and Their Application as Phase Transfer Catalysts", (Makromol. Chem.) vol. 148, pp. 535-543, 1983.
Newbould, "Controlling MeH Viscosity of High Melting Point Polyamides", (Adhesives Age) New. 1986, pp. 24-29.

*Primary Examiner*—Harold D. Anderson
*Attorney, Agent, or Firm*—Jack H. Park; Kenneth R. Priem; Carl G. Ries

[57] ABSTRACT

Polyamide reaction products comprising: a dicarboxylic acid and a diamine component comprising a mixture of poly(oxytetramethylene) diamines and oligomers of said poly(oxytetramethylene) diamines, said mixture containing from about 85 to about 99.5 wt. % of said poly(oxytetramethylene) diamines and, correspondingly, from about 15 to about 0.5 wt. % of said oligomers, said poly(oxytetramethylene) diamines having the formula:

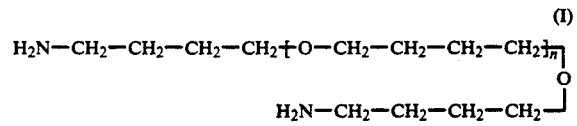

wherein n represents 0 or a positive number having a value of 1 to about 30, said oligomers having the formula:

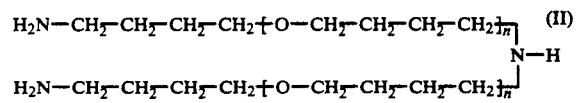

wherein n represents 0 or a positive number having a value of 1 to about 30.

15 Claims, No Drawings

THERMOPLASTIC THERMOSETTABLE POLYAMIDE FROM POLY(OXYTETRAMETHYLENE) DIAMINE AND POLY(OXYTETRAMETHYLENE) OLIGOMER POLYAMINE

BACKGROUND OF THE INVENTION

1. Technical Field of the Invention

This invention relates to thermoplastic thermosettable polyamides having enhanced low temperature flexibility and high temperature thermal stability properties. More particularly, this invention relates to modified polyamides that are essentially linear and thermoplastic at temperatures of less than about 250° C. and thermosetable at temperatures of about 250° C. or more (e.g., 260° to 300° C.); such polyamides being useful in the formation of fibers, molded parts, hot melt adhesives, etc. Still more particularly, this invention relates to polyamides modified by the inclusion therein of mixtures of poly(oxytetramethylene) diprimary amines with poly(oxytetramethylene) oligomers containing one or more internal secondary amine groups and terminal primary amine groups.

2. Prior Art

Poly(oxytetramethylene) diprimary amine oligomers containing internal secondary amine groups are disclosed in Schoenieben et al. European Patent No. 0,354,501 dated Jun. 8, 1989.

Nakagawa et al. U.S. Pat. No. 3,558,419 is directed to composite filaments and fibers wherein one of the components is a polyalkylene ether-polyamide-block copolymer containing linear polyamide segments and polyoxyalkylene ether segments. Amine derivatives of polyoxyethylene glycols, when incorporated into polyamides, tend to affect the water solubility characteristics of the resultant polyamides.

In Yeakey et al. U.S. Pat. No. 4,128,525, thermoplastic adhesive components are disclosed which are prepared from a polyoxypropylene polyamine, piperazine and a dicarboxylic acid.

Linear polymeric amines prepared by first propoxylating a poly(oxytetramethylene) glycol and then reductively aminating the adduct are disclosed in Watts, Jr. et al. U.S. Pat. No. 4,181,682.

Rasmussen U.S. Pat. No. 4,218,351 is directed to impact resistant thermoplastic polyamides composed of a short chain polyamide-forming moiety, a polyamide-forming dimer acid moiety and a polyamide-forming oligomer moiety.

Wettable adhesives comprising a mixture of polyvinyl alcohol and a water soluble polyamide are disclosed in Soerens U.S. Pat. No. 4,684,439. The polyamide comprises a reaction product of a polyoxyalkylene polyamine, a saturated aliphatic dicarboxylic acid and a polyalkylene polyamine.

Mitchell et al. U.S. Pat. No. 4,062,820 is directed to hot melt adhesives prepared by the co-condensation of stoichiometric amounts of (a) a mixture of a polymeric fatty acid and a saturated aliphatic dicarboxylic acid with (b) a mixture of a saturated aliphatic diamine with either a polyoxyethylene diamine or a polyoxypropylene diamine.

Resinous polyoxamide thermoplastic adhesive compositions are disclosed in Schulze U.S. Pat. No. 4,119,615 that are prepared by reacting a polyoxypropylene diamine or a polyoxypropylene triamine with oxalic acid or a dialkyl ester of oxalic acid to prepare a liquid prepolymer that is then reacted with a diamine to provide the resinous polyoxamide.

Resinous thermoplastic adhesive compositions are disclosed in Klein U.S. Pat. No. 4,133,803 that are prepared by reacting a polyoxypropylene diamine or a polyoxypropylene triamine, such as ethylene diamine, with an aromatic or aliphatic dicarboxylic acid or an ester or anhydride thereof, such as isophthalic acid, dimethyl terephthalate or phthalic anhydride.

Vogel U.S. Pat. No. 4,151,173 discloses lubricating oil additives prepared by reacting a polyoxyalkylene polyamine, such as a polyoxypropylene diamine or a polyoxypropylene triamine with a carboxylic acid acylating agent such as a polyisobutenyl succinic anhydride.

Thermoplastic adhesive compositions are disclosed in Yeakey et al. U.S. Pat. No. 4,162,931 and Yeakey et al. U.S. Pat. No. 4,182,845 that are prepared by reacting a polyoxypropylene diamine or a polyoxypropylene triamine with piperazine and an aromatic or aliphatic dicarboxylic acid or an ester or anhydride thereof, such as isophthalic acid.

Rieder U.S. Pat. No. 4,239,635 discloses carboxylic acid terminated diamides, and the alkali metal, ammonium and amine salts thereof prepared by reacting an excess of a polyoxyalkylene polyamine, such as a polyoxypropylene diamine with an excess of an organic polycarboxylic acid.

Hot melt adhesive copolyamide compositions are disclosed in Sharkey U.S. Pat. No. 4,282,346 that are prepared by reacting a polyoxypropylene diamine with piperazine and mixture of a long-chain and a short-chain saturated aliphatic dicarboxylic acid such as adipic acid and azelaic acid.

See also, Vol. 18, pp. 328–436 of the *Encyclopedia of Chemical Technology*, Kirk Othmer, 3rd Edition.

Newbould in an article entitled "Controlling Melt Viscosity of High Melting Point Polyamides" (*Adhesives Age*, November 1986, pp. 24–29) discusses polyamide-type hot melt adhesives such as those prepared from hexamethylene diamine, adipic acid, azelaic acid or dimer acids.

Iwabuchi et al. in a paper entitled "Preparation of Regularly Sequenced Polyamides with Definite Numbers of Oxyethylene Units and Their Application as Phase Transfer Catalysts" (*Makromol. Chem.*, Vol. 184, pp. 535–543 (1983)) disclose polyamides having oligo-(oxyethylene) segments prepared from alpha-(2-aminoethyl)-omega-aminooligo(oxyethylenes) and dicarboxylic acid chlorides.

BACKGROUND INFORMATION

As exemplified by the prior art mentioned above, polyamides formed by the polymerization of amino acids or the co-condensation of aliphatic diamines with dicarboxylic acids, and frequently referred to as "nylons" or nylon-type materials, are useful for a variety of purposes, including film and fiber preparation, the formation of molded parts, the preparation of hot melt adhesives, etc. The results obtained through the use of such materials have generally been satisfactory, but there is need for improvement.

SUMMARY OF THE INVENTION

This invention relates to polyamides modified by the inclusion therein of a mixture of poly(oxytetramethylene) diamines and oligomers thereof that are useful in the formation of fibers, molded parts, hot melt adhesives, etc., such poly(oxytetramethylene) diamines having the following formulas:

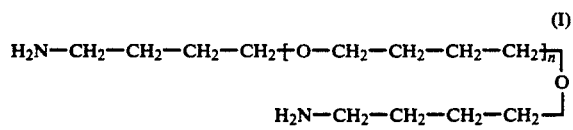

wherein n represents 0 or a positive number having a value of 1 to about 30, and
the oligomers have the formula:

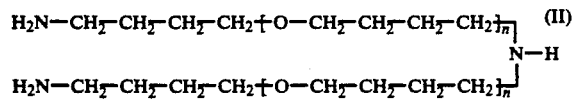

wherein n represents 0 or a positive number having a value of 1 to about 30.

In copending Speranza et al. application Ser. No. entitled "Modified Polyamides having Improved Thermal Stability", filed of an even date herewith, it is disclosed that improved flexibility can be imparted to polyamides when the polyamides are modified by the incorporation therein of a poly(oxytetramethylene) diamine having the formula:

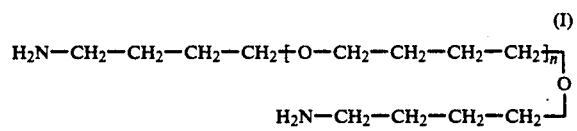

wherein n represents 0 or a positive number having a value of 1 to about 30.

In accordance with the present invention the physical properties, including low temperature properties of polyamides, are still further improved through the further incorporation into polyamides of poly(oxytetramethylene) diamine oligomers having the formula:

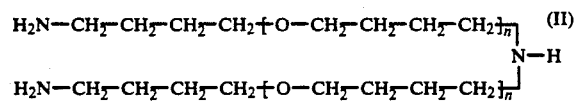

wherein n represents 0 or a positive number having a value of 1 to about 30.

DETAILED DESCRIPTION

The polyamide-modifying starting materials for the present invention are poly(oxytetramethylene) diamines having the formulas:

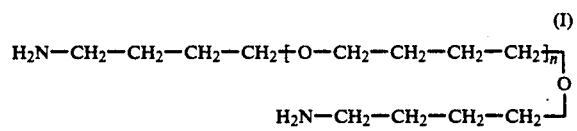

wherein n represents 0 or a positive number having a value of 1 to about 30, and oligomers thereof having the formula:

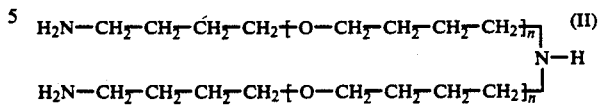

wherein n represents 0 or a positive number having a value of 1 to about 30.

The starting materials for the preparation of polyamides include dicarboxylic acids, such as those selected from the group consisting of alkane dicarboxylic acids containing 6 to 12 carbon atoms and unsubstituted or $C_1$-$C_4$ alkyl substituted benzene dicarboxylic acids, saturated aliphatic amino acids containing 6 to 12 carbon atoms, saturated aliphatic lactams containing 6 to 12 carbon atoms, and saturated aliphatic diamines containing 2 to 12 carbon atoms.

The Poly(oxytetramethylene) Diamines

The poly(oxytetramethylene) diamine starting materials to be used in accordance with the present invention can be prepared by the process disclosed in copending Larken et al. U.S. patent application Ser. No. 07/452,146, filed Dec. 18, 1989, and entitled "Improved Catalytic Method for the Reductive Amination of Poly(oxytetramethylene) Glycols".

Diamines having molecular weights of about 250, 650, 1,000 and 2,000 can be obtained from poly(oxytetramethylene) glycols through the use of the process disclosed in Larken et al. copending application Ser. No. 07/452,146, filed Dec. 18, 1989, by bringing a poly(oxytetramethylene) glycol into contact with an appropriate nickel, copper, molybdenum, chromium catalyst in the presence of from about 1 to 300 moles of ammonia per mole of poly(oxytetramethylene) glycol and about 0.1 to 10 moles of hydrogen per mole of poly(oxytetramethylene) glycol under suitable reductive amination conditions, including a temperature of about 150° to about 220° C., a pressure of about 100 to about 10,000 psig and a reaction time of about 0.5 to 5 hours.

The practice of this process will result in the substantial conversion of the terminal hydroxyl groups of the glycol to terminal primary amine groups.

At comparatively high reductive amination conversion levels, such as conversion levels of more than about 90% of the poly(oxytetramethylene) glycol, a minor amount of the conversion reaction product (e.g., about 5% or less) will contain secondary amine groups, such as secondary amines having the formula:

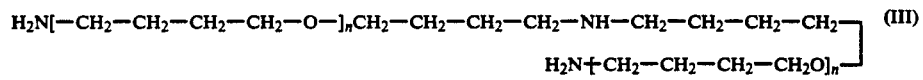

wherein n has a value of 0 to about 30.

At lower reductive amination conversion levels of about 50% or less, the formation of secondary amine groups is insignificant.

In the practice of the present invention it is necessary to use both of the primary diamine products of formula I and oligomers of formula II. This can be accomplished by conducting the reaction at a comparatively high conversion level of about 90% or more.

The oligomers can also be prepared by the process disclosed in Schoenieben et al. European Patent No. 0,354,501.

POLYAMIDE PREPARATION

The Dicarboxylic Acid Starting Materials

The dicarboxylic acids to be used in the preparation of polyamides are of the type known to those skilled in the art, such as dicarboxylic acids selected from the group consisting of alkane dicarboxylic acids containing 6 to 12 carbon atoms and unsubstituted or alkyl substituted benzene dicarboxylic acids.

Suitable saturated aliphatic dicarboxylic acids that may be used include compounds such as adipic acid, pimelic acid, suberic acid, azelaic acid, sebacic acid, dodecane-dioic acid, etc., and mixtures thereof.

Suitable unsubstituted or $C_1$–$C_4$ alkyl substituted benzene dicarboxylic acids that may be used include compounds such as benzene dicarboxylic acids, isophthalic acid, terephthalic acid, etc., and mixtures thereof.

The Saturated Aliphatic Amino Acid Starting Materials

Representative saturated aliphatic amino acid starting materials include amino acids containing 6 to 12 carbon atoms.

Examples of amino acids that may be used are compounds such as 6-aminocaproic acid, 11-aminoundecaneoic acid, etc., and mixtures thereof.

The Saturated Lactam Starting Materials

The saturated aliphatic lactams that may be used as starting materials are saturated lactams containing 6 to 12 carbon atoms, Lactams such as epsilon caprolactam, enantholactam, capryllactam, undecanolactam, laurylactam and alkyl substituted caprolactams, etc., and mixtures thereof may be used. The preferred starting material is epsilon caprolactam.

The Aliphatic Diamine Starting Materials

Representative saturated aliphatic diamines that may be used as starting materials are saturated aliphatic diamines containing 2 to 12 carbon atoms, such as ethylene diamine, tetramethylenediamine, hexamethylenediamine, dodecamethylenediamine, piperazine, 2,5-dimethyl piperazine, diaminocyclohexane, etc.

Preferred Embodiments

In accordance with the present invention, a mixture of the poly(oxytetramethylene) diamine of formula I with oligomers of formula II is prepared for incorporation into a polyamide, such mixture containing from about 0.1 to about 15 wt. % of the oligomers. When the mixture is to be incorporated into a polyamide to be used for the preparation fibers, it is preferred that the mixture contain from about 0.1 to about 10 wt. % of the oligomers. When molded articles or hot melt adhesives are to be prepared, the mixture will suitably contain from about 1 to about 10 wt. % of the oligomers.

In accordance with one preferred embodiment of the present invention, a polyamide is prepared by reacting an equimolar amount of a dicarboxylic acid component with a diamine component consisting of a mixture of the poly(oxytetramethylene) diamines of formula I with oligomers of formula II and the two components are then mixed and reacted in accordance with known polyamide-forming procedures to prepare a polyamide co-condensation product.

In general, such polyamide co-condensation products are characterized by good color, good low temperature stability and good flexibility. The co-condensation products can also be used to prepare fibers, films, molded products, adhesives, etc.

In accordance with another preferred embodiment of the present invention, a polyamide is prepared from a first component composed of equimolar portions of a poly(oxytetramethylene) diamine and oligomers thereof and a dicarboxylic acid and a second component composed of equimolar amounts of a saturated aliphatic diamine containing 2 to about 12 carbon atoms and a dicarboxylic acid, as defined above. In accordance with this embodiment, the first component may be used in the form of a salt of a poly(oxytetramethylene) diamine or oligomer with a dicarboxylic acid which is reacted with the second component, and the second component may also be used in the form of an aliphatic diamine salt of a dicarboxylic acid. Alternately, the aliphatic diamine, the poly(oxytetramethylene) diamine and the dicarboxylic acid can be used in monomeric form and co-reacted in a single reaction step.

As a third alternative, the first components can be co-reacted to form a first co-polyamide, the second components can be reacted to form a second co-polyamide and the first co-polyamide can then be blended with the second co-polyamide to form a polyblend.

In accordance with this preferred embodiment, the final polyamide co-condensation product will be composed, preferably, of about 5 to about 100 wt. % of the first components and, correspondingly, from about 95 to about 0 wt. % of the second components. The final polyamide co-condensation products are characterized, in general, as having good thermostability properties, good flexibility properties and improved toughness. They may be used, for example, to prepare films, fibers, molded products and elastomers.

In accordance with a third preferred embodiment, a co-polyamide co-condensation product is prepared from a first component composed of equimolar portions of a dicarboxylic acid and poly(oxytetramethylene) diamines and oligomers thereof and a second component composed of a saturated aliphatic lactam containing 6 to 12 carbon atoms. Again, the first component may be used in the form of a salt of a poly(oxytetramethylene) diamine with a dicarboxylic acid which is coreacted with the second component, or the components may be used as monomers and co-condensed. The final polyamide co-condensation product will be composed, preferably, of about 5 to about 100 wt. % of the first components and, correspondingly, from about 95 to about 0 wt. % of the second component. The final polyamide co-condensation products are characterized, in general, as having good thermostability properties, good flexibility properties and improved toughness. They may be used, for example, to prepare fibers, and elastomers.

In accordance with a fourth preferred embodiment of the present invention, a co-polyamide co-condensation product is prepared from a first component composed of equimolar portions of a dicarboxylic acid and poly(oxytetramethylene) diamines and oligomers thereof and a second component composed of a saturated aliphatic amino acid containing 6 to about 12 carbon atoms. As previously indicated, the first component may be used in the form of a salt of a poly(oxytetramethylene) diamine with a dicarboxylic acid and may be co-reacted with the second component, or the components may be used as monomers and co-condensed. The final polyamide co-condensation product will be composed, preferably, of about 5 to about 100 wt. % of the first components and, correspondingly, from about 95 to about 0 wt. % of the second component. The final polyamide co-condensation products are characterized, in general, as having good thermostability properties, good flexibility properties and improved toughness. They may be used, for example, to prepare fibers, and elastomers.

Reaction Conditions

The reactants are copolymerized under conventional reaction conditions in a reactor provided with suitable temperature control means and suitable agitation means at a temperature, for example, within the range of about 150° to about 300° C. for a reaction time within the range of about 2 to about 10 hours. A catalyst is not required. An oxidation inhibitor may be included in the reaction mixture to prevent oxidated deterioration of the reaction product. Suitable oxidation inhibitors include materials such as Ultranox 246, Irganox 1010, Irganox 1098, Irganox 1171, Irgafos 168 and mixtures thereof.

Thermosetability

The polyamide products of the present invention, as prepared, are thermoplastic materials that may be formed into desired final products such as hot-melt adhesives, moldings, films and fibers by known polyamide utilization procedures and may also be modified, in accordance with known technology, by the incorporation therein of other components such as conventional polyamides or other polymers and additives such as fillers, dyes, oxidation inhibitors, etc.

The polyamides of the present invention will remain thermoplastic at temperatures of about 250° C. or less. However, if the polyamides are heated to higher temperatures, cross-linking may occur, at least to a limited extent.

In accordance with a further preferred embodiment of the present invention, this unusual property is deliberately utilized by forming the thermoplastic polyamide into a desired form at a temperature of less than about 250° C. and by then heating the formed polyamide to a thermosetting temperature, such as a temperature of about 260° to about 300° C., preferably in an inert atmosphere, for about 0.1 to about 10 hours to thermoset the polyamide and thereby enhance the rigidity of the polyamide.

In the conversion of alcohols to amines by the action of ammonia over a metal catalyst primary, secondary and tertiary amines may form.

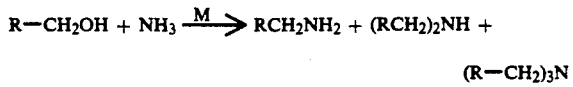

The reaction using secondary alcohols is more selective and less secondary and tertiary amines are formed.

To convert diprimary glycols to diamines is very difficult. In the aminolysis of polytetrahydrofuran there is always some triamine formed when the reaction is carried out to high conversion.

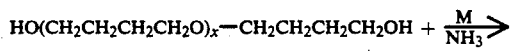

$$NH_2(CH_2CH_2CH_2CH_2O)_x-CH_2CH_2CH_2CH_2NH_2 +$$

(A)

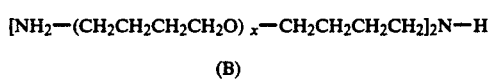

(B)

It would be very desirable to use these amines because they have polyether groups which are more heat stable than conventional polyether polyamines. For example, when adipic acid was heated with products containing A and B, where x is greater than 2, colorless crosslinked polymers were obtained that were heat stable at 283° C. under nitrogen. When this amine mixture was heated with sebacic acid or terephthalic acid, under the same conditions as that used in the adipic reaction, soft weak elastomeric fibers would be obtained. It was not until the reaction was carried out at 280° C. and 0.2 mm did we obtain the expected cross-linked polymer. Thus, the diamines mixed with the triamines have the potential of being important in the preparation of thermoset polymers. For adhesive applications, the polyamidation might be carried out to only a partial extent and then cured at a later stage.

A clear use for these compounds are as tackifying additives for adhesives when used in conjunction with other dicarboxylic acids such as diamido acids. One product from the 1000 molecular weight polyol in which a high secondary amine content was made on purpose was studied (amine A+B).

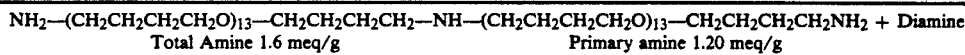

| | Total Amine 1.6 meq/g | | Primary amine 1.20 meq/g | |
|---|---|---|---|---|
| Acid, moles | Amine A + B, moles | | Amine, moles | Remarks |
| adipic, 1 | 1 | | — | Hard, tough, elastic, transparent, not liquid at 250° C. |
| dimer, 1 | 1 | | — | Tough, elastic, transparent, not liquid at 250° C. |
| adipic, 1 | 0.1 | | triethylene glycol diamine, 0.9 | Tough, hard, opaque molten at 190° C. |
| dimer, 1 | 0.5 | | ethylenediamine*, | Pliable solid, not |

-continued

NH$_2$—(CH$_2$CH$_2$CH$_2$CH$_2$O)$_{13}$—CH$_2$CH$_2$CH$_2$CH$_2$—NH—(CH$_2$CH$_2$CH$_2$CH$_2$O)$_{13}$—CH$_2$CH$_2$CH$_2$CH$_2$NH$_2$ + Diamine
Total Amine 1.6 meq/g    Primary amine 1.20 meq/g

| Acid, moles | Amine A + B, moles | Amine, moles | Remarks |
| --- | --- | --- | --- |
| adipic, 1 | 0.1 | 0.5 hexamethylenediamine, 0.9 | liquid at 250° C. Hard, opaque, softens at about 150° C., waxy at 250° C. |

*The ethylenediamine and dimer acid were prereacted before reaction with amine A + B.

When compounds A and B are both mixed with dicarboxylic acids such as adipic and sebacic at 260°-300° C., crosslinked polymers are formed. The degree of crosslinking depends on the amount of B. If B is present in small amounts and these components are mixed with dicarboxylic acids and caprolactam, adipic acid, hexamethylene diamine, amino acids, its polyamides are formed which can be melt spun into fibers or molded. In such cases the concentration of A is much greater than B and the combination of A and B represents a minor portion of the amino fraction of the polymer—up to about 30% if the proportion of A to B is very high.

The advantage of using the polyether amines described in this invention is that they are heat stable amines which impart flexibility to the polyamides. For example, similar compounds such as C and D are less color stable when heated to 280° C. with adipic acid (x is 0, 1, 2, 3, etc.).

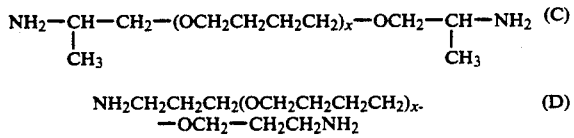

As an example, compounds such as C and D start to turn light yellow when heated with a molar amount of adipic acid under nitrogen at 250° C. A mixture containing A and B when heated with a molar amount of adipic acid remained colorless when heated to 283° C. under nitrogen.

The introduction of a small amount of a triamine can be beneficial to the process of polyamine formation (see U.S. Pat. No. 4,906,783 and references therein). The triamine used in our work also adds impact strength to the polyamides.

EXAMPLES

The present invention will be further illustrated by the following specific examples which are given by way of illustration and which are not intended as limitations on the scope of this invention.

EXAMPLE 1

Examples 1 and 2 utilize a poly(oxytetramethylene) diamine (6374-61-1) which had the following analysis:
Total acetylatables 1.952 meq/g
Amine assay 1.838 meq/g
Primary amine 1.729 meq/g It is estimated that product was about 94% amine with about 94% of the amine being primary diamines. Water (2.0 parts), 0.62 parts 6374-61-1, 0.083 parts of adipic acid and 3.616 parts of caprolactam was heated at 270°-280° C. for five hours. Excellent fibers were pulled from the melted polymer.

EXAMPLE 2

Water (1.5 parts), 3.87 parts caprolactam, 0.58 parts 6374-61-1 and sebacic acid were heated at 270-290° C. for five hours. Nice fibers were obtained.

EXAMPLE 3

Terephthalic acid (1.66 parts), 2.36 parts 6600-53-7 (diaminotri-1,4-butylene glycol), and 0.5 parts of water were heated at 280° C. for three hours and then at 280° C. for 3 hours at 0.3 mm. (Purified nitrogen was passed through the contents in this and all experiments described.) Fibers were obtained, although somewhat brittle indicating higher temperatures may be required.

EXAMPLE 4

Examples 4 and 5 utilize a poly(oxytetramethylene) 6374-77-3 which had the following analysis:
Total acetylatables 2.71 meq/g
Total amine 2.60 meq/g (95%)
Primary amine 2.40 meq/g (92%)

In a small reactor was heated 3.1 parts of 6374-77-3 and 0.56 parts of adipic acid and the contents heated at 280° C. for four hours. An off-white, transparent, elastomeric product was obtained. A steel ball did not penetrate the polymer at 280° C., which indicated that crosslinking had taken place. Thermogravimetric analysis showed a weight loss of only 0.3% at 300° C. and 1.0% loss at 350° C. when heated under nitrogen.

EXAMPLE 5

Sample 6374-77-3 (3.04 parts) was heated with 0.77 parts of sebacic acid for four hours at 260° C. At this point nice, long fibers could be pulled from the sample and the product melted at 60° C. The sample was then heated at 280° C. and 0.2 mm pressure for three hours. The product was a hard, rubbery rock which stuck to glass.

EXAMPLE 6

Polyamine 6374-61-1 (3.57 parts) was heated with 0.76 parts of dodecanedioc acid at 260° C. for 3.5 hours. The product melted at 80° C. and was colorless, hard elastomer. It showed 1% weight loss at 350° C. when heated for 10 minutes at 350° C. under nitrogen. When a steel ball was placed on the sample in a tube and the contents heated to 282° C., the ball sank only part of the way indicating crosslinking was taking place at the higher temperature.

EXAMPLE 7

When 0.48 parts of terephthalic acid were heated with 3.15 parts of 6374-61-1 for four hours at 260° C., and at 280° C. for three hours under vacuum, fairly strong elastic fibers could be pulled from the molten mass. This experiment demonstrates that aliphatic dibasic acids increase the rate of the crosslinking step over aromatic dibasic acids.

In Examples 1-7 we have shown how fibers may be formed and how high molecular weight tough thermoset elastomeric polyamine adhesives can be made. Additional flexibility can be added by the addition of dimer acid. Other modifications can be made by the addition of other amines. Essentially, all of the formulations led to flexible adhesive-type products except those where some incompatibility resulted. In such formulations, the products were usually hard and opaque.

Having thus described our invention, what is claimed is:

1. A polyamide polymerization product of a dicarboxylic acid component selected from the group consisting of alkane dicarboxylic acids containing 6 to 12 carbon atoms and unsubstituted or $C_1$-$C_4$ alkyl substituted benzene dicarboxylic acids, and polyamine component consisting of a mixture of about 85 to 99.5 wt. % of a poly(oxytetramethylene) diamine component and, correspondingly, from about 15 to about 0.5 wt. % of a poly(oxytetramethylene) diamine oligomer component and, with or without, a saturated aliphatic amino acid containing 4 to 12 carbon atoms, a saturated aliphatic lactam containing 6 to 12 carbon atoms, or a saturated aliphatic diamine containing 2 to 12 carbon atoms, said poly(oxytetramethylene) diamine component having the formula:

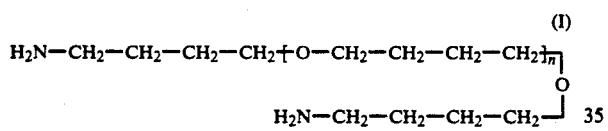

wherein n represents 0 or a positive number having a value of 1 to about 30, said poly(oxytetramethylene) diamine oligomer component having the formula:

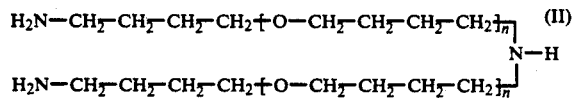

wherein n represents 0 or a positive number having a value of 1 to about 30.

2. A polyamide polymerization product of from about 5 to 95 mol% of a salt of a dicarboxylic acid selected from the group consisting of alkane dicarboxylic acids containing 3 to 12 carbon atoms and unsubstituted or methyl substituted benzene dicarboxylic acids and a diamine component with, correspondingly, from about 95 to 5 mol% of a saturated aliphatic lactam containing 6 to 12 carbon atoms, said diamine component consisting essentially of a mixture of poly(oxytetramethylene) diamines and oligomers of said poly(oxytetramethylene) diamines, said mixture containing from about 85 to about 99.5 wt. % of said poly(oxytetramethylene) diamines and, correspondingly, from about 15 to about 0.5 wt. % of said oligomers, said poly(oxytetramethylene) diamines having the formula:

wherein n represents 0 or a positive number having a value of 1 to about 30, said oligomers having the formula:

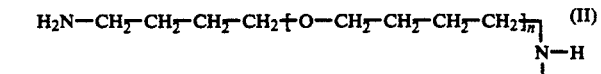

wherein n represents 0 or a positive number having a value of 1 to about 30.

3. A polyamide polymerization product as in claim 2 wherein the dicarboxylic acid is adipic acid and the caprolactam is epsilon-caprolactam.

4. A polyamide polymerization product prepared from 5 to 100 wt. % of a first component consisting essentially of equimolar amounts of a dicarboxylic acid selected from the group consisting of alkane dicarboxylic acids containing 6 to 12 carbon atoms and unsubstituted or methyl substituted benzene dicarboxylic acids and a second component consisting essentially of a mixture of 85 to 99.5 wt. % of poly(oxytetramethylene) diamines and, correspondingly, from about 15 to about 0.5 wt. % of oligomers of said poly(oxytetramethylene) diamine and with up to about 95 wt. % of a polyamide co-condensation product of an equimolar mixture of a saturated aliphatic diamine containing 2 to 12 carbon atoms with a dibasic acid selected from the group consisting of alkane dicarboxylic acids containing 6 to 12 carbon atoms and unsubstituted or methyl substituted benzene dicarboxylic acids, said poly(oxyatetramethylene) diamines having the formula:

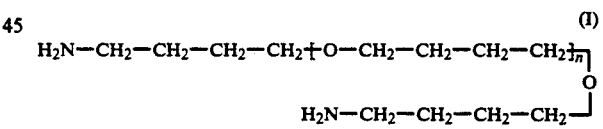

wherein n represents 0 or a positive number having a value of 1 to about 30, said oligomers having the formula:

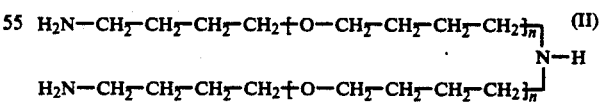

wherein n represents 0 or a positive number having a value of 1 to about 30.

5. A polyamide polymerization product as in claim 4 wherein the dicarboxylic acid is an alkane dicarboxylic acid containing 6 to 12 carbon atoms.

6. A polyamide polymerization product as in claim 5 wherein the dicarboxylic acid is adipic acid.

7. A polyamide polymerization product as in claim 5 wherein the dicarboxylic acid is sebacic acid.

8. A polyamide polymerization product as in claim 4 wherein the dicarboxylic acid is a benzene dicarboxylic acid.

9. A polyamide polymerization product as in claim 8 wherein the dicarboxylic acid is terephthalic acid.

10. A polyamide polymerization product prepared from 5 to 100 wt. % of a first component consisting essentially of equimolar amounts of a dicarboxylic acid selected from the group consisting of alkane dicarboxylic acids containing 6 to 12 carbon atoms and unsubstituted or methyl substituted benzene dicarboxylic acids and a second component consisting essentially of a mixture of 85 to 99.5 wt. % of poly(oxytetramethylene) diamine and, correspondingly, from about 15 to about 0.5 wt. % of oligomers of said poly(oxytetramethylene) diamine, and with:
 up to about 95 wt. % of a saturated aliphatic lactam containing 6 to 12 carbon atoms, or
 up to about 95 wt. % of an equimolar mixture of a saturated aliphatic diamine containing 2 to 12 carbon atoms with a dicarboxylic acid selected from the group consisting of alkane dicarboxylic acids containing 6 to 12 carbon atoms and unsubstituted or methyl substituted benzene dicarboxylic acids,
 said poly(oxyatetramethylene) diamine component having the formula:

$$H_2N-CH_2-CH_2-CH_2-CH_2+O-CH_2-CH_2-CH_2-CH_2\overline{)_n} \atop H_2N-CH_2-CH_2-CH_2-CH_2 \rceil_O \quad (I)$$

wherein n represents a positive number having a value of 1 to about 30,
said poly(oxytetramethylene) diamine oligomer component having the formula:

$$H_2N-CH_2-CH_2-CH_2-CH_2+O-CH_2-CH_2-CH_2-CH_2\overline{)_n} \atop H_2N-CH_2-CH_2-CH_2-CH_2+O-CH_2-CH_2-CH_2-CH_2\overline{)_n} \rceil N-H \quad (III)$$

wherein n represents 0 or a positive number having a value of 1 to about 30.

11. A polyamide polymerization product as in claim 10 wherein the dicarboxylic acid is an alkane dicarboxylic acid containing 3 to 12 carbon atoms.

12. A polyamide polymerization product as in claim 11 wherein the dicarboxylic acid is adipic acid.

13. A polyamide polymerization product as in claim 11 wherein the dicarboxylic acid is sebacic acid.

14. A polyamide polymerization product as in claim 10 wherein the dicarboxylic acid is a benzene dicarboxylic acid.

15. A polyamide polymerization product as in claim 14 wherein the dicarboxylic acid is terephthalic acid.

* * * * *